March 21, 1961 D. F. RIDENOUR 2,976,442
PRESSURE RESPONSIVE TRANSDUCER FOR GASES
UTILIZING RADIOACTIVE IONIZING SOURCE
Filed July 7, 1958 2 Sheets-Sheet 1
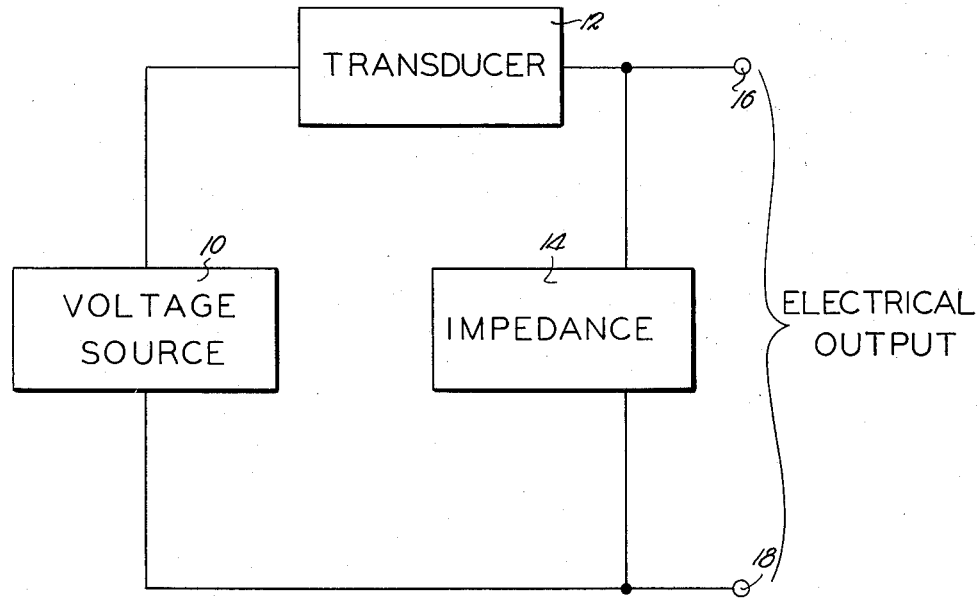
Fig. 1.
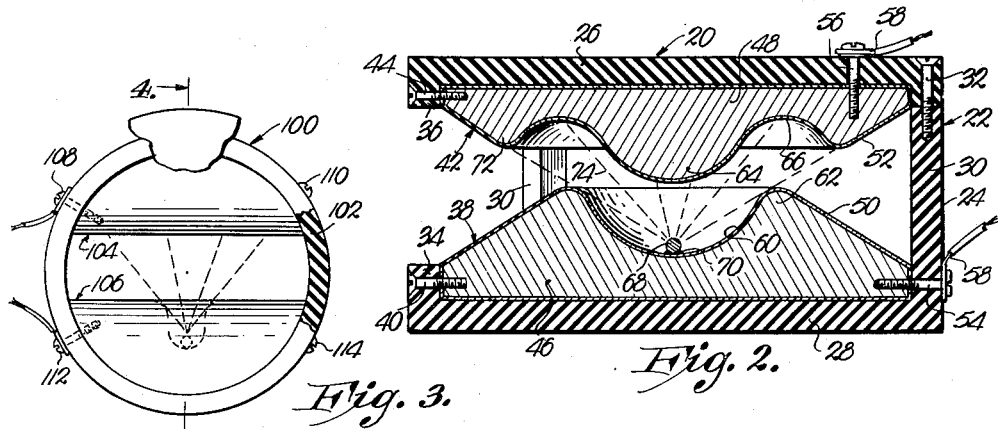
Fig. 2.
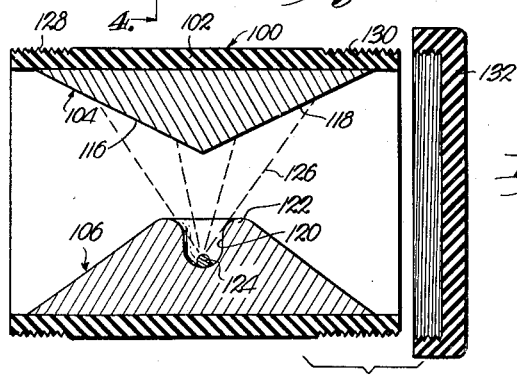
Fig. 3.
Fig. 4.
INVENTOR.
Dale F. Ridenour
BY
ATTORNEY.

March 21, 1961  D. F. RIDENOUR  2,976,442
PRESSURE RESPONSIVE TRANSDUCER FOR GASES
UTILIZING RADIOACTIVE IONIZING SOURCE
Filed July 7, 1958  2 Sheets-Sheet 2

INVENTOR.
Dale F. Ridenour
BY
ATTORNEY.

United States Patent Office 2,976,442
Patented Mar. 21, 1961

2,976,442

PRESSURE RESPONSIVE TRANSDUCER FOR GASES UTILIZING RADIOACTIVE IONIZING SOURCE

Dale F. Ridenour, Sierra Vista, Ariz.
(707 Henrietta Ave., Sunnyvale, Calif.)

Filed July 7, 1958, Ser. No. 746,805

5 Claims. (Cl. 313—54)

This invention relates to pressure responsive transducer apparatus and particularly to an improved transducer for responding to dynamic, positive pressures of gases.

It is an important object of the invention to provide such a transducer in which the conversion of the physical pressure parameter to an electrical voltage parameter is effectuated in direct fashion without the necessity for employing any moving parts or other mechanically operative devices.

It is another important object of the invention to provide such a transducer in which a radioactive emitter is utilized to ionize a quantity of the gas whose dynamic pressure is to be transduced, there being electrically conductive electrode structures on different sides of the ionized space within the gas, the operation of such transducer depending upon the physical facts that the degree of ionization within the zone of the gas between the conductive electrode structures will vary in accordance with the pressure of the gas, and the electrical impedance or resistance prevailing between the electrode structures will vary in accordance with the degree of ionization of the gas therebetween.

Another important object of the invention is to provide such a transducer which is adapted to respond with good linearity to rapid, high frequency or transient changes in the positive pressure of a gas.

Another important object of the invention is to provide such a transducer which requires no vacuum tight chamber and may be operated in the open atmosphere for transducing the dynamic pressure of air at the zone of its location or may be disposed in its open condition within a substantially vast body of gas within a large container or the like, and in either case, will respond to pressure waves or changes imposed thereon from any of a plurality of directions.

It is another important object of the invention to provide such a transducer which is characterized by its high efficiency while utilizing as its radioactive source an isotope type emitter whose zone of dangerous radiation may be conveniently limited by shielding means of thickness and nature permitting miniaturization of the entire assembly and other conveniences and advantages in manufacture and use without compromising considerations of safety.

Another important object of the invention is to provide such a transducer whose efficiency, fast response characteristics, multidirectional sensitivity and small size adapt it for use in applications and locations heretofore requiring the employment of less efficient and accurate types of transducers exemplary applications for the transducers of the present invention including the transduction of voice, music or other sound waves, transient waves such as shock waves, explosion blasts and the like, and high frequency flutter waves or other complex wave forms such as may emanate from air foil control surfaces, movements or vibrations of machine elements and the like.

Still other important objects of the invention, including significant details of construction, will be made clear or become apparent as the following description of preferred and illustrative embodiments of the invention progresses.

In the accompanying drawings:

Fig. 1 is a schematic diagram of the preferred form of circuit arrangement for utilizing the type of transducers contemplated by the invention;

Fig. 2 is a central, cross sectional view of a first, preferred embodiment of transducer contemplated by the invention;

Fig. 3 is an end elevational view of a second illustrative embodiment of transducer contemplated by the invention, with certain parts broken away and shown in cross section for clarity of illustration;

Fig. 4 is a cross sectional view of the transducer of Fig. 3 taken on line 4—4 of Fig. 3;

Figure 5:
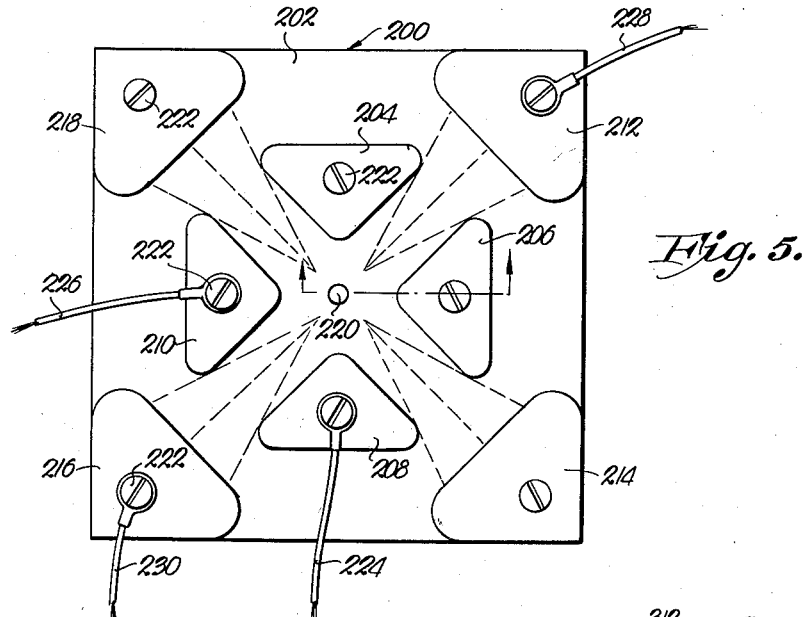
Fig. 5 is a view of a third illustrative embodiment of transducer contemplated by the invention which may be of either plane or side elevational character depending upon the orientation in which the transducer is disposed.

The electrical conductivity of air and certain other gases and vapors increases with the degree of ionization thereof. The radiations from radioactive sources are adapted to ionize various gases including air, the degree of ionization increasing as the pressure of the air or other gas increases. Combing these two principles, it will be clear that changes of pressure in a gas being ionized by radiations from a radioactive emitter will result in corresponding changes in the degree of ionization which are attended by corresponding changes in the electrical conductivity of the gas through the ionized zone thereof. It is upon the employment of such principles of operation that the transducers contemplated by the present iinvention depend.

Although various radioactive substances might be used in order to best ionize various gases whose pressures are to be transduced, the invention may be illustrated in terms of a preferred embodiment of transducer responsive to dynamic changes in the positive pressure of air which utilizes as the radioactive substance an isotope emitter in the nature of plutonium 239. The utilization of such an isotope emitter element in preference to certain other radioactive substances is to be preferred for several reasons. First, the alpha particle radiations from a plutonium 239 isotope emitter element of quite small mass are sufficient to accomplish the degree of ionization of air or the like required for the practice of the present invention and may be safely employed with much less radiation shielding than if radioactive substances which radiate stronger types or greater amounts of radiations were to be utilized. Secondly, those skilled in the handling of radioactive substances have accumulated a certain amount of knowledge respecting the properties and behavior of plutonium 239 which is not commonly available with respect to certain other radioactive isotopes that are, as yet, less well known. Those skilled in the art will recognize, however, that other types of radioactive emitters now being made available by the government for proper purposes could also be used, if desired.

Referring now to Fig. 1, wherein is shown an illustrative and generalized schematic arrangement of electrical circuitry for utilizing transducers as contemplated by this invention, the numeral 10 generally designates an electrical voltage source which could be of alternating or pulsating character for special applications, but typically might consist of a carefully regulated, direct current voltage supply. A transducer of the type contemplated by the invention is designated by the numeral 12, and, as will now be understood, operates in the manner of an impedance or resistance whose value changes in accordance with the pressure of a gas introduced thereto. A load impedance which may be resistive or inductive or capacitive, or a combination thereof, is indicated by the numeral 14. A pair of output terminals 16 and 18 adapted for coupling to an electric current meter, oscilloscope or other apparatus for indicating or recording an electrical parameter are provided and have the impedance 14 coupled therebetween. In a preferred arrangement, the voltage source 10 and transducer 12 are coupled in a series arrangement with each other, which arrangement is in turn coupled between the output terminals 16 and 18 or in parallel with the impedance 14.

It will be clear that, in operation, as the impedance of transducer 12 varies with dynamic changes in gas pressure, the amount of current flowing from one side of the voltage source 10 through the transducer 12 and load impedance 14 back to the other side of the voltage 10 will vary and that the voltage drop across the impedance 14 will be thereby correspondingly varied to present across the output therminals 16 and 18 a voltage or potential whose magnitude may change continuously and rapidly in correspondence with changes in the dynamic pressure of the gas at which the transducer 12 is subjected.

Referring next to the embodiment of transducer illustrated in Fig. 2 and generally designated by the numeral 20, such transducer 20 may, in a preferred construction, include a frame generally designated 22 having a normally bottom section 24 and a normally top portion 26, it being understood that the orientation of the transducer 20 may be changed as desired to avail of the substantially omnidirectional response characteristics thereof in one plane, as will hereinafter become clear. Bottom section 24 may include a bottom plate 28 of circular shape having a number of upstanding post portions 30 spaced around its margins for supporting the preferably circular upper section 26, which may be secured to posts 30 as by screws 32. The bottom section 28 may be provided with an upstanding marginal flange 34, and the upper section 26 may be provided with a depending marginal flange 36, it being significant that the area between the spaced flanges 34 and 36 is open except for the occasional interruption thereof by the supporting parts 30.

A first combination electrically conductive electrode and radiation shielding structure generally designated 38 is supported upon the bottom plate 28 of lower section 24 with its lower portion within the confines of the flange 34 to which it may be secured as by screws 40. A second combination electrically conductive electrode and radiation shielding structure generally designated 42 is supported from the upper section 26 with its upper portion within the confines of the flange 36 to which it may be secured as by screws 44.

Since the structures 38 and 42 each function, insofar as their overall assemblies are concerned, both as a conductive electrode and as means for shielding against radioactive radiations whose source will hereinafter be identified, certain characteristics, materials or constructions must be employed, even though a number of alternatives are available. In order for the structures 38 and 42 to be electrically conductive without having unduly high electrical resistance characteristics, it is preferred that they be formed, at least in part, of a metal having high electrical conductivity characteristics. In order for such structures 38 and 42 to serve as effective confining shields for radiations, it is necessary that a material be employed which has satisfactory radiation shielding characteristics. A first alternative is to construct the structures 38 and 42 of lead, which is noted for its efficiency in radiation shielding and also has a sufficiently high electrical conductivity to be operable in a number of applications. A second alternative is to form the structures 38 and 42 of a metal alloy which may include lead, in order to have the radiation shielding properties thereof, together with another metal or metals such as copper, tin or the like, in order to enhance the electrical conductivity characteristics. A third alternative is to form the main body portions 46 and 48 of structures 38 and 42 respectively of high efficiency radiation shielding material such as lead and to provide a thin coating or layer of metal such as copper, silver, gold or the like upon the exterior surfaces of the body portions 46 and 48, such highly conductive coatings being indicated in Fig. 2 in great exaggeration as to thickness at 50 upon the body portion 46 of structure 38 and at 52 upon the body portion 48 of structure 42. Since it is difficult to distinguish in the drawings between pure metals or alloys and since it would appear sufficient to illustrate in exaggeration the use of coatings such as at 50 and 52 in only one figure, it is to be understood that the structures such as at 38 and 42 forming a part of each of the embodiments to be described, may be constructed in accordance with any of the alternatives just described.

It may now be pointed out that the frame 22 is preferably formed, as indicated in Fig. 2, of electrical insulating material, such as Bakelite, glass, ceramics, various plastics or the like, in order to provide a substantially nonconductive means for holding the structures 38 and 42 in their predetermined spaced relationship. If desired, a protective jacket (not shown) of metal or the like could be provided upon the outer surfaces of the frame sections 24 and 26 to give additional shielding or/ and mechanical stability. Any suitable means for effecting electrical connections with the structures 38 and 42 respectively may be provided, a convenient means of accomplishing such end being the provision of screws as at 54 and 56 threaded into the structures 38 and 42 respectively and provided with wire receiving lugs as at 58. In the embodiment of Fig. 2, the structure 38 is provided with a substantially semispherical concavity 60 therein located centrally of the top surface thereof and surrounded at its open extremity by an annular defilade portion as at 62. The central portion of structure 42 is of configuration generally complementary to the opposed surface of structure 38 and includes a downwardly projecting, central convex portion 64 surrounded by an annular groove 66 of arcuate cross section in opposition to the defilade portion 62 of the structure 38. The outer margins of both the structure 38 and the structure 42 are inclined away from each other to provide easy access to the space between the central portions of structures 38 and 42 by surrounding gas.

Preferably, at substantially the deepest extremity of the concavity 60, a radioactive emitter element 68 of a type as hereinbefore described, is provided. The radioactive isotope or other substance comprising the radiating element 68 may be in various configurations, but preferably will constitute a small mass of solid material which is for convenience represented in the drawings in exaggerated size as a ball-like element which may be secured to the surface of the structure 38 by any suitable solder, adhesive or other means as at 70.

It will be noted that the defilade portion 62 of the structure 38 will be so arranged with respect to the annular portion 72 of structure 42 surrounding the groove 66 to confine all straight line radiations from the element 68 to paths which must pass into either the structure 38 or the structure 42 for absorption therewithin. It will also be observed, however, that the configuration of the structures 38 and 42 and the location of the element 68 is such that gas will be ionized by radiation such as indicated at 74 throughout a relatively large space disposed between relatively large opposed areas of the structures 38 and 42. By such means, a sufficient volume of ionized gas may be obtained between the structure 38 and 42 to provide a practical level of electrical resistance between the latter without resort to an unduly strong radiating element 68.

Although the operation of the transducer 20 will be clear from the preceding discussion of the principles of functioning of the various embodiments of transducer contemplated by this invention, it may be noted that the drawings necessarily depict the apparatus in substantial exaggeration as to size and that the entire transducer 20 may be of the order of one centimeter or less in diameter if miniaturization is an important requirement in a particular application.

Referring next to the embodiment shown in Figs. 3 and 4, the transducer is generally designated by the numeral 100 and will be seen from the drawings to include a tubular body or frame 102 of electrical insulating material within which a pair of combination shielding and conductive structures of the nature heretofore described are provided and designated by the numerals 104 and 106. Structures 104 and 106 are supported within the frame 102 in spaced opposition to one another by screw means as at 108, 110, 112 and 114, the screws 108 and 112 also being adapted to serve in providing an electrical connection to the corresponding of structures 104 and 106.

As best seen in Fig. 4, structure 104 may be configured with a pair of sloping surfaces 116 and 118 with the maximum thickness of the structure 104 adjacent the center of the frame 102. The structure 106 is preferably provided with a concavity 120 therein surrounded by a defilade portion 122. A radioactive emitter element 124 of the kind previously described is mounted in the same fashion as previously indicated at the deepest point of the concavity 120. Straight line radiations as at 126 from the emitter element 124 are confined by the defilade portion 122 to paths which will intersect either structure 104 or 106 at zones of substantial thickness thereof for providing the necessary shielding.

The embodiment of Figs. 3 and 4 is adapted for best response to pressure waves or changes imposed upon the transducer 100 from the direction of either of the open ends of the frame 102. It is, therefore, substantially bidirectional in its sensitivity, as compared with the substantially omnidirectional sensitivity of the transducer 20 of Fig. 2.

In order to illustrate how the transducers contemplated by this invention may be adapted for special uses other than where they are simply disposed within the atmosphere to respond to fluctuations of air pressure, the frame 102 of transducer 100 is illustrated as externally threaded at 128 adjacent one end thereof. Such threads 128 may be utilized for coupling the transducer 100 to a gas carrying line having a complementally threaded coupling. The adaptability of the transducer 100 is further illustrated by the provision of external threading 130 on the frame 102 adjacent the opposite end thereof and the provision of an internally threaded sealing cap 132, which may be screwed upon the threads 130 to adapt the transducer 100 for use in a closed, pressurized system with the end of frame 102 opposite the sealing cap 132 coupled to a gas containing line or container.

The embodiment of Fig. 5 illustrates the possible utilization of a greater plurality of combination shielding and conductive electrode structures. The transducer of Fig. 5 is generally designated 200 and includes a base plate 202 of insulating material to which an inner plurality of shielding and conductive structures 204, 206, 208 and 210 are secured in any suitable manner and disposed in spaced, opposed pairs 204—208 and 206—210. A second plurality of shielding and conductive electrode structures 212, 214, 216 and 218 are also secured to the base plate 202 in any suitable manner and arranged in opposed pairs 212—216 and 214—218. A radiation emitting element 220 of the character hereinbefore mentioned, may be mounted in any suitable fashion at the center of the inner group of structures 204, 206, 208 and 210, it being noted that the outer structures 212, 214, 216 and 218 are of such size and so disposed relative to the spaces between adjacent pairs of the inner structures 204, 206, 208 and 210 to intercept any straight line radiations from the element 220 which had not been intercepted by one of the inner structures 204, 206, 208 or 210. Each of the structures 204–218 inclusive is provided with a screw or the like 222 to permit the effectuation of an electrical connection thereto.

Since air, or perhaps another gas, disposed within the path of straight line radiations from the element 220 will be ionized, it is clear that various combinations or all of the structures 212–218 inclusive may be utilized in suitable pairs as pressure transducing devices. Merely for purposes of example, wires 224 and 226 are shown as respectively coupled with structures 208 and 210 to present one transducing device, while wires 228 and 230 are shown as coupled with structures 212 and 216 respectively to present a second transducer output. It may be noted that in the embodiment of Fig. 5, the radiations from element 220 are shielded only within a zone substantially parallel to the plane of the base plate 202. If the escape of radiations from the element 220 in a direction, for instance, perpendicular to the plane of base plate 202 is objectionable, suitable auxiliary shielding means (not shown) could obviously be provided, which it is noted, could consist of further combination shielding and conductive structures disposed in the third dimension to provide still further transducer outputs.

In the embodiment shown in Fig. 6, the transducer 300 is provided with a frame 302 having upper and lower sections 304 and 306 of insulating material configured similarly to the frame 22 described in connection with the embodiment of Fig. 2, except that an even number of posts 308 are provided and arranged in opposed pairs. A combination shielding and conductive structure 310 may be secured to the top section 306 of frame 302 and electrical connection thereto effected through a screw 312. The lower structure 314 provided with a concavity 316 having the radiating element 318 mounted therein may, however, be utilized only for shielding purposes. A pair of highly conductive electrode elements 320 and 322 are provided and mounted in any suitable fashion between a pair of opposed posts 308 in order to extend across the open extremity of the concavity 316 and, therefore, be within the line of radiations emanating from the plutonium 239 or other radiating element 318. Electrical connections to electrodes 320 and 322 are effected through screws 324 and 326 respectively. The transducer 300 will provide one transducer output between the electrodes 320 and 322 and further transducer outputs between the structure 310 and the electrodes 320 or/and 322.

Figure 6:
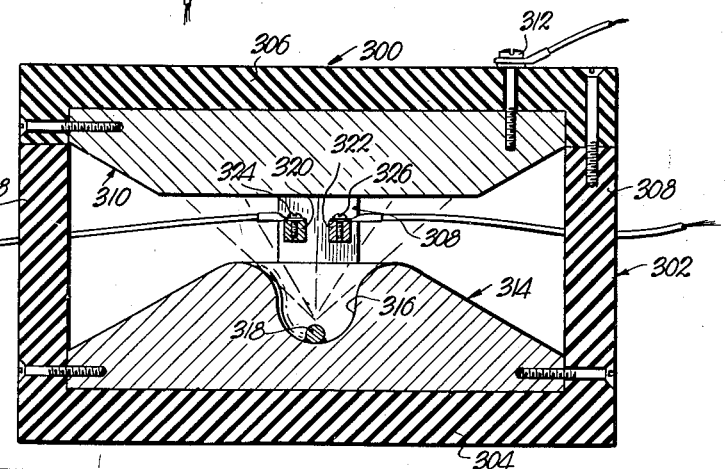
Fig. 6 is a central, cross sectional view of a fourth illustrative embodiment of transducer contemplated by the invention.
Figure 7:
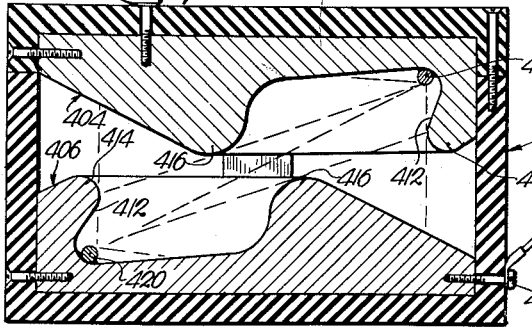
Fig. 7 is a central, cross sectional view of a fifth illustrative embodiment of transducer contemplated by the invention.

The embodiment of transducer in Fig. 7 is generally designated 400 and includes a frame 402 similar to that described for the transducer 300 of Fig. 6. In transducer 400, however, both of the opposed, spaced structures 404 and 406 may be of combination shielding and electrically conductive characteristics by virtue of the construction thereof in one of the manners previously described. Electrical connections to structures 404 and 406 may be effected through screws 408 and 410 respectively.

The transducer 402 is differentiated from those previously described in that each of the structures 404 and 406 is provided with a concavity 412 therein, such concavities being so configured and surrounded at their open extremities by defilade portions as at 414 and 416 that a coinciding zone of straight line radiations from the deepest point of each of the concavities 412 toward the deepest point of the opposite concavity 412 is defined between the structures 404 and 406. A separate radiating element of the character heretofore described is mounted within the concavity 412 of each of the structures 404 and 406, such elements being respectively designated 418 and 420.

Since the radiations from the elements 418 and 420 both traverse the same zone or space between the structures 404 and 406, it will be clear that a higher degree of ionization of gas within such space may be obtained than if only one of the elements 418 or 420 were employed. This permits a relatively high degree of ionization between the structures 404 and 406 while employing elements 418 and 420 which are each characterized by a certain minimum level of radiation power less than if only a single element were provided. The advantages thus gained by way of minimization of the necessary shielding and the consequent advantages with respect to miniaturization will be apparent.

It will now be clear that this invention contemplates a class of dynamic pressure transducers involving no mechanical conversion in the transducing action performed and which are of high efficiency, relatively simple construction and adapted to attain all of the objects and advantages cited at the commencement of this specification. It will also be perceived by those skilled in the art from the illustrations given that a number of minor modifications or changes could be made from the precise details of construction of the embodiments described for illustrative purposes without departing from the true spirit, intention or novel concepts of the invention. Accordingly, it is to be understood that the invention shall be deemed limited only by the fair scope of the claims that follow.

Having thus described the invention, what is claimed as new and desired to be secured by Letters Patent is:

1. Apparatus for providing a variable electrical output corresponding to the dynamic pressure of a gas comprising an electrical, constant voltage, power source; a pair of output terminal means adapted to have an electrical meter coupled therebetween; an electrical impedance coupled between said terminal means; a pair of electrically conductive structures spaced and electrically insulated from each other and adapted to receive said gas therebetween; a quantity of radioactive substance disposed to direct radiations therefrom into the space between said structures; electrical circuit means coupling said power source in series between one of said structures and one of said terminal means; and electrical circuit means coupling the other of said structures with the other of said terminal means.

2. In apparatus as set forth in claim 1, wherein both of said structures are of radiation shielding characteristics, and said substance is disposed between said structures.

3. In apparatus as set forth in claim 2, wherein one of said structures is provided with a concavity therein, said substance is disposed in said concavity, portions of said one structure adjacent the mouth of said concavity present a defilade for limiting the straight line paths of radiations emanating from said concavity to a given zone, and the other of said structures is of such extent and is so juxtaposed to said concavity as to bound the entirety of said zone oppositely from said concavity, whereby all of said radiations are shielded against escape from said apparatus.

4. In apparatus as set forth in claim 3, wherein said other structure includes a convex portion directly opposite said concavity of said one structure, whereby to increase the area of that part of said other structure bounding said zone.

5. In apparatus as set forth in claim 2, wherein said structures each comprise a main body of material having high radiation shielding characteristics provided with a coating of highly electrically conductive metal upon at least certain opposed surface portions thereof.

References Cited in the file of this patent

UNITED STATES PATENTS

| | | |
|---|---|---|
| 2,641,710 | Pompeo et al. | June 9, 1953 |
| 2,824,246 | Keller | Feb. 18, 1958 |